(12) United States Patent
Kikuchi

(10) Patent No.: US 7,167,235 B2
(45) Date of Patent: Jan. 23, 2007

(54) MOVING BODY TRANSMITTER AND RECEIVER AXIS ADJUSTING SYSTEM

(75) Inventor: Hayato Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 265 days.

(21) Appl. No.: 10/731,438

(22) Filed: Dec. 10, 2003

(65) Prior Publication Data

US 2004/0217899 A1  Nov. 4, 2004

(30) Foreign Application Priority Data

Dec. 11, 2002  (JP)  ............... 2002-359813

(51) Int. Cl.
  *G01C 3/08*  (2006.01)
  *G01B 11/26*  (2006.01)
(52) U.S. Cl. .................. 356/4.01; 356/5.01; 356/141.1
(58) Field of Classification Search ............... 356/4.01, 356/5.01, 28, 141.1; 342/70–72
  See application file for complete search history.

(56) References Cited

U.S. PATENT DOCUMENTS

| | | | | |
|---|---|---|---|---|
| 4,632,543 A | * | 12/1986 | Endo | .................. 356/5.08 |
| 5,731,779 A | | 3/1998 | Kikuchi | .................. 342/70 |
| 6,119,067 A | * | 9/2000 | Kikuchi | .................. 701/300 |
| 6,122,040 A | | 9/2000 | Arita et al. | .................. 356/4.01 |
| 6,229,597 B1 | | 5/2001 | Kikuchi | .................. 356/4.01 |
| 6,327,029 B1 | * | 12/2001 | Matsuoka | .................. 356/5.01 |

FOREIGN PATENT DOCUMENTS

| | | |
|---|---|---|
| JP | 2000-258527 | 9/2000 |
| JP | 3114849 | 9/2000 |

OTHER PUBLICATIONS

Patent Abstracts of Japan for Pub. No. 2000 258527, published Sep. 22, 2000; For: Adjusting Method for Radar Axis of Radar Apparatus for Vehicle and Radar Apparatus for Vehicle; Applicant: Hitachi Ltd.
Patent Abstracts of Japan for Pub. No. 09304535, published Nov. 28, 1997; For: Apparatus and Method for Measurement; Applicant: Omron Corp.

* cited by examiner

*Primary Examiner*—Thomas H. Tarcza
*Assistant Examiner*—Isam Alsomiri
(74) *Attorney, Agent, or Firm*—Arent Fox PLLC

(57) ABSTRACT

A moving body transmitter and receiver axis adjusting system includes a radar system mounted on a moving body and having a scanning area of 10° and a detection area of 8° in each of the left and right directions, and carrying out auto aiming to adjust the detection area in left and right directions inside the scanning area so that an object detection axis that is the center of the detection area coincides with a reference reflecting body placed on a vehicle center line. When a deviation between the object detection axis and the reference reflecting body exceeds 2°, adjustment cannot be completed only by auto aiming. In this case, the angle at which the radar system is mounted on the vehicle body is manually adjusted in the left and right directions so that the object detection axis overlaps the vehicle center line.

4 Claims, 19 Drawing Sheets

INITIAL STATE

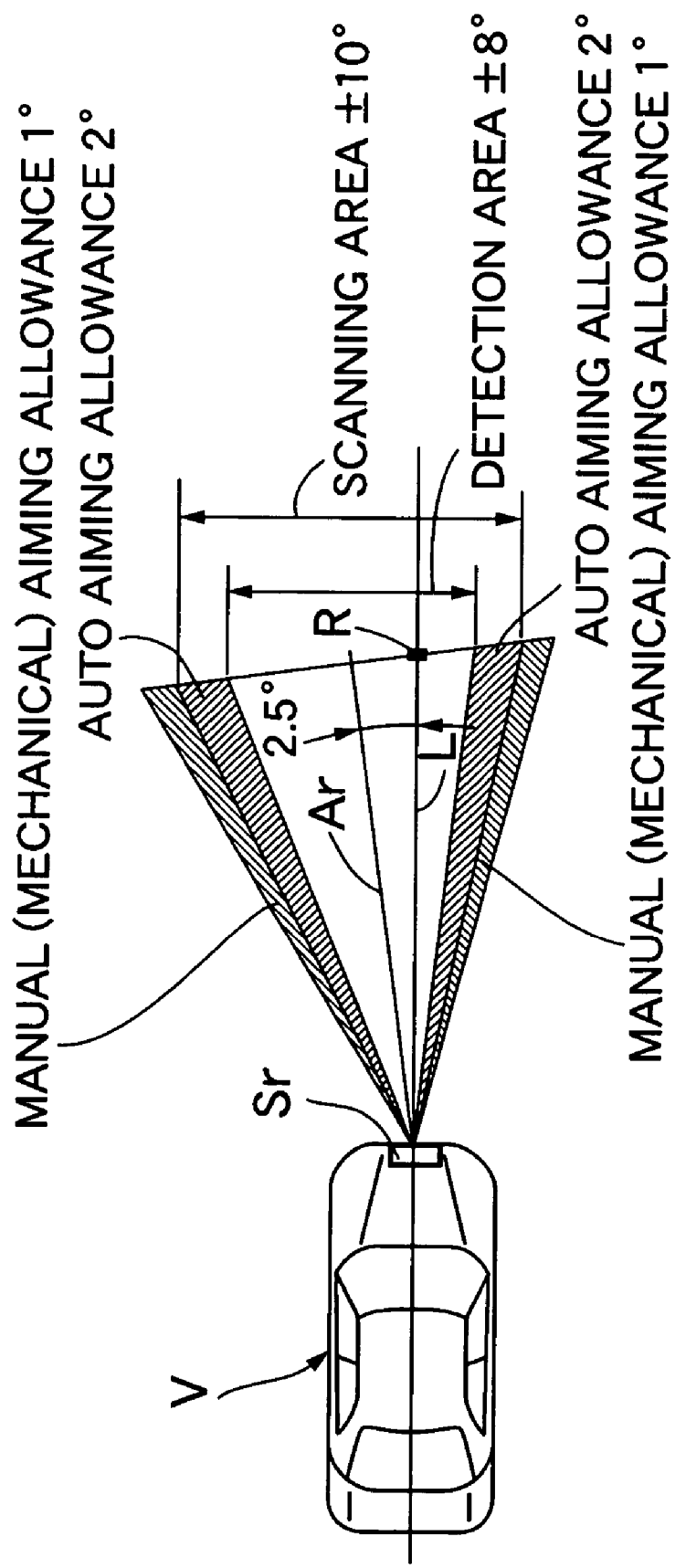

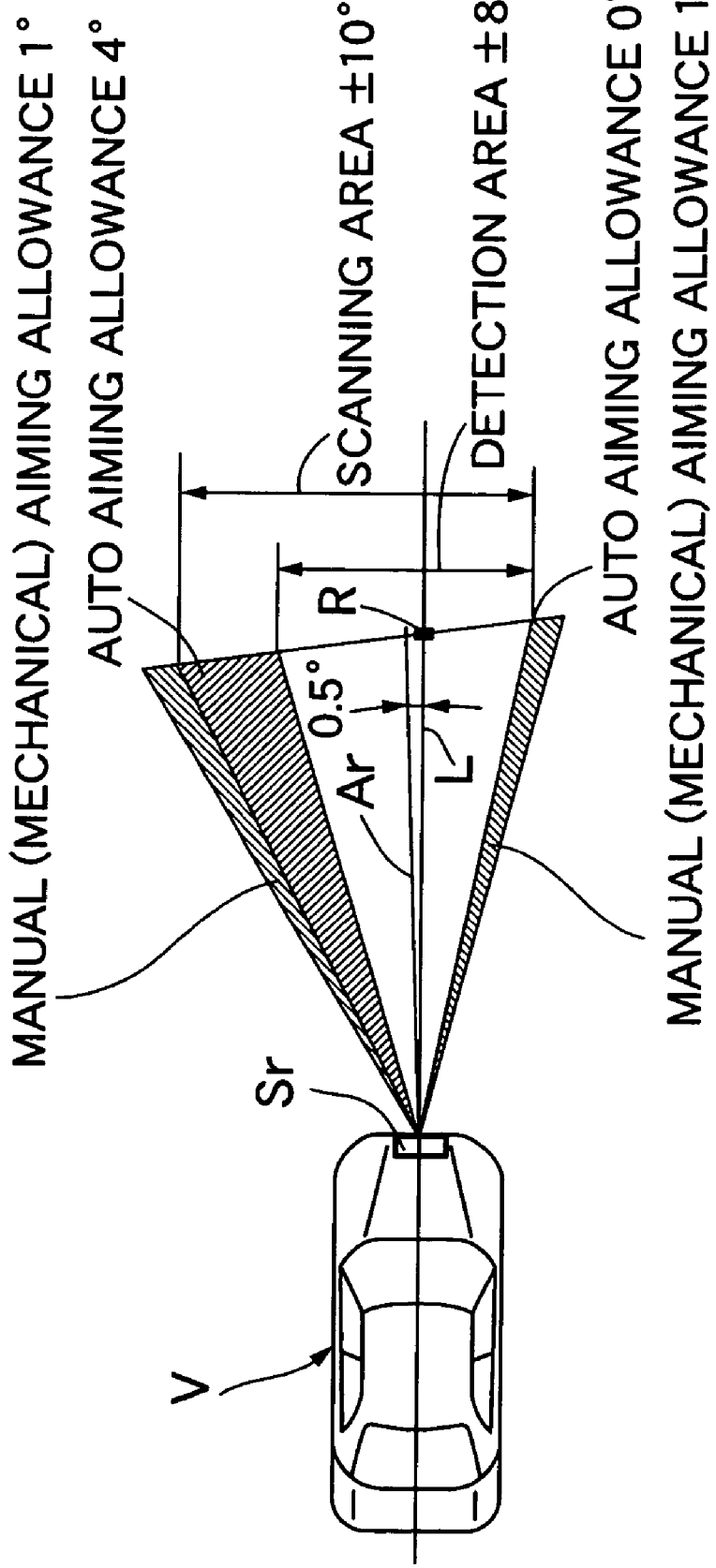

INITIAL STATE

AUTO AIMING COMPLETION STATE (DETECTION AREA NOT EQUAL IN LEFT AND RIGHT)
DISPLAY INDICATION  L 0.5

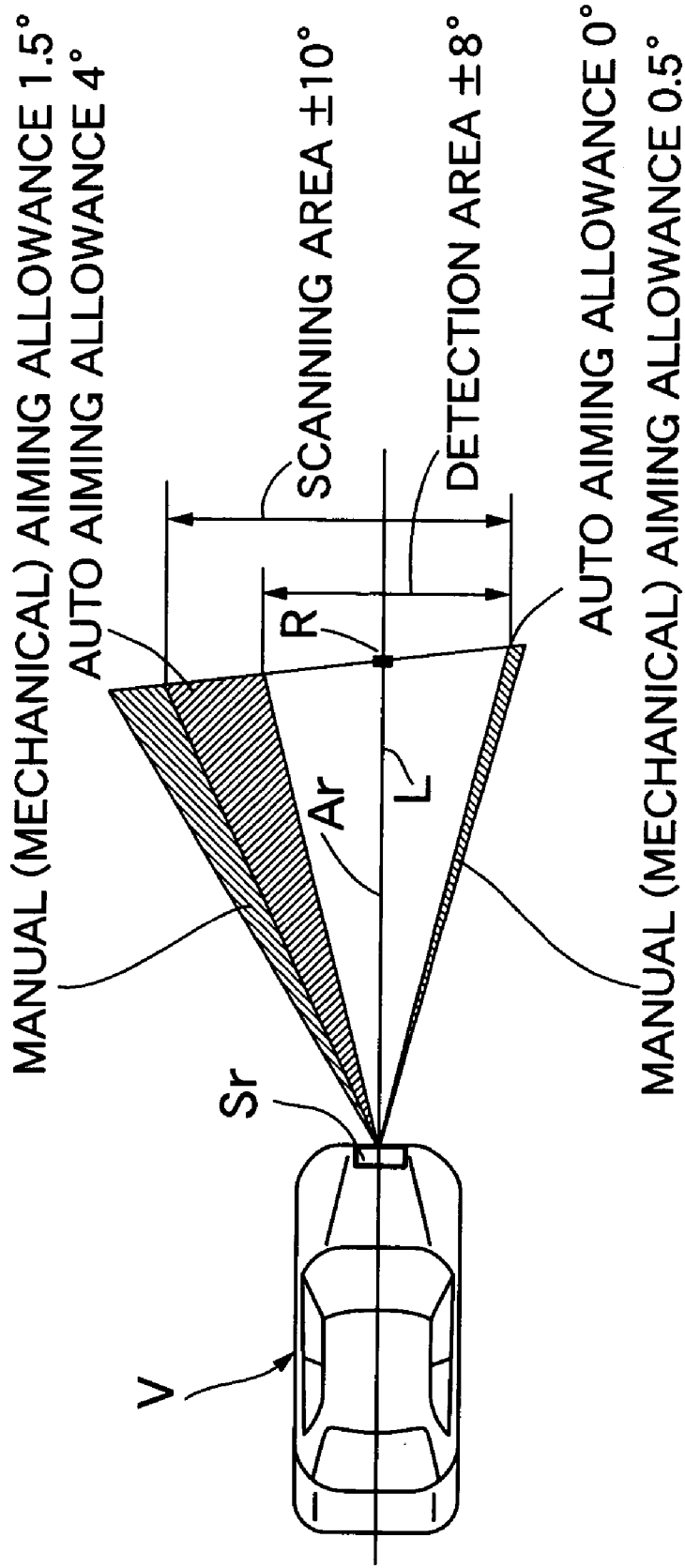

MOVING BODY TRANSMITTER AND RECEIVER AXIS ADJUSTING SYSTEM

BACKGROUND OF THE INVENTION

1. Field of the Invention

The present invention relates to a system for adjusting an axis of a transmitter and receiver mounted on a moving body, wherein the transmitter and receiver transmits a detection signal toward a predetermined scanning area and receives, as a reflected signal, the detection signal reflected from an object positioned ahead of the moving body.

2. Description of the Related Art

When a radar used in an adaptive cruise control system (ACC system), a Stop & Go system (congestion tracking system), a vehicle interval alarm system, and other such known systems, is mounted on a vehicle, unless the object detection axis of the radar is correctly directed in a preset direction, such systems are known to malfunction as a result of erroneously detecting an oncoming vehicle in an adjacent lane, and/or do not function at all as a result of only detecting a road surface, an overpass, or a signboard instead of a preceding vehicle.

Japanese Patent No. 3114849 and Japanese Patent Application Laid-open No. 2000-258527 disclose systems which make the object detection axis of a radar accurately coincide with a preset direction (aiming).

In the system described in Japanese Patent No. 3114849, a radar fixed to a vehicle body transmits a detection signal in a relatively wide preset scanning area. Based on the results detected by the radar using a reference reflecting body placed directly in front of the vehicle body, a detection area in which the reference reflecting body is positioned at the center, is set within the scanning area. At this point, the angle at which the radar is mounted on the vehicle body is not adjusted, but rather, auto aiming is carried out using computer software to set the detection area.

The system described in Japanese Patent No. 3114849 suffers from the problem of necessarily having to set a scanning area that is wider than the detection area in which the object is actually detected to ensure the detection area is set therein, which results in a wasted region in which the object is not actually detected although the object is detectable. For example, when the lateral detection area is 16°, and the angular error of mounting the radar on the vehicle body is ±3°, it is necessary to ensure that the scanning area is 16°+2×3°=22°, wherein 6° (27%) of the scanning area is the wasted region.

In the system described in Japanese Patent Application Laid-open No. 2000-258527, when a deviation of the radar axis relative to the vehicle travel direction is detected, the radar axis is made to coincide with the vehicle travel direction by rotating an adjustment bolt used to mount the radar on the vehicle body.

The system disclosed in Japanese Patent Application Laid-open No. 2000-258527 suffers from the problem of having to manually rotate the adjustment bolt in order to accurately adjust the radar axis, which can be quite a troublesome operation.

SUMMARY OF THE INVENTION

The present invention has been achieved under the above-mentioned circumstances in order to enable auto aiming while minimizing the size of the wasted region wherein the transmitter and receiver does not detect an object.

In accordance with a first aspect, the present invention provides a moving body transmitter and receiver axis adjusting system that includes a transmitter and receiver mounted on a moving body. The transmitter and receiver transmits a detection signal in a predetermined scanning area and receives, as a reflected signal, the detection signal reflected from an object. A reference reflecting body is placed in a predetermined position relative to the moving body and reflects the detection signal. Automatic adjusting means sets a detection area included in, and narrower than the scanning area. The automatic adjusting means adjusts the detection area within the scanning area to position the reference reflecting body on an object detection axis of the detection area. Informing means informs of a deviation between the object detection axis and the reference reflecting body when the deviation exceeds an area adjustable by the automatic adjusting means.

In accordance with this arrangement, the automatic adjusting means adjusts the detection area within the scanning area to position the reference reflecting body on the object detection axis of the detection area. When such an adjustment cannot be performed, the informing means informs of the deviation. Accordingly, the reference reflecting body is positioned on the object detection axis of the detection area by auto aiming while preventing a region, not directly used to detect the object, from increasing as a result of having to set the scanning area unnecessarily wide. Moreover, when the reference reflecting body cannot be positioned on the object detection axis by auto aiming, the informing means informs of the deviation to raise an alarm.

A second aspect of the present invention provides a moving body transmitter and receiver axis adjusting system wherein the transmitter and receiver is mounted on the moving body via manual adjusting means in order to adjust a deviation between the reference reflecting body and the object detection axis exceeding an area adjustable by the automatic adjusting means.

In accordance with this arrangement, when the deviation between the object detection axis and the reference reflecting body cannot be adjusted by the automatic adjusting means, the deviation is adjusted by the manual adjusting means.

A third aspect of the present invention provides a moving body transmitter and receiver axis adjusting system that includes a transmitter and receiver mounted on a moving body. The transmitter and receiver transmits a detection signal in a predetermined scanning area and receives, as a reflected signal, the detection signal reflected from an object. A reference reflecting body is placed in a predetermined position relative to the moving body and reflects the detection signal. Automatic adjusting means sets a detection area narrower than the scanning area. The automatic adjusting means adjusts the detection area within the scanning area to position the reference reflecting body on an object detection axis of the detection area. Informing means informs of the extent to which the detection area is outside the scanning area as a result of adjustments by the automatic adjusting means.

In accordance with this arrangement, when the automatic adjusting means adjusts the detection area within the scanning area to position the reference reflecting body on the object detection axis of the detection area, if a portion of the detection area extends outside the scanning area, the informing means informs of the extent to which the portion extends outside the detection area. Accordingly, the reference reflecting body is positioned on the object detection axis of the detection area by auto aiming while preventing a region not being directly used for detecting the object from increasing as a result of setting the scanning area unnecessarily wide. Moreover, when a portion of the detection area extends outside the scanning area due to the auto aiming, the informing means informs of the extent the portion extends outside the detection area and raises an alarm.

Moreover, in accordance with a fourth aspect of the present invention, a moving body transmitter and receiver axis adjusting system is provided wherein the transmitter and receiver is mounted on the moving body via manually adjustable manual adjusting means. Accordingly, the extent to which the detection area is outside the scanning area by adjusting the automatic adjusting means is reduced to zero and the detection area falls within the scanning area.

In accordance with this arrangement, even when adjustment by the automatic adjusting means cannot be carried out to prevent the detection area from extending outside the scanning area, the manual adjusting means allows such an adjustment to be executed.

A radar system Sr of an embodiment corresponds to the transmitter and receiver of the present invention. A vehicle V of the embodiment corresponds to the moving body of the present invention. An auto aiming circuit 29 of the embodiment corresponds to the automatic adjusting means of the present invention. A display 30 of the embodiment corresponds to the informing means of the present invention. Adjustment bolts 36a to 36c of the embodiment correspond to the manual adjusting means of the present invention.

The above-mentioned aspects, characteristics, and advantages of the present invention will become apparent from an explanation of the preferred embodiments that will be described in detail below with reference to the attached drawings.

BRIEF DESCRIPTION OF THE DRAWINGS

FIGS. 11A–C are diagrams showing the initial through completed operational states when axis adjustment is completed using a combination of auto and manual aiming;

FIGS. 14A–C are diagrams showing the initial through completed operational states when axis adjustment is completed using a combination of auto and manual aiming.

DETAILED DESCRIPTION OF THE PREFERRED EMBODIMENTS

Figure 1:
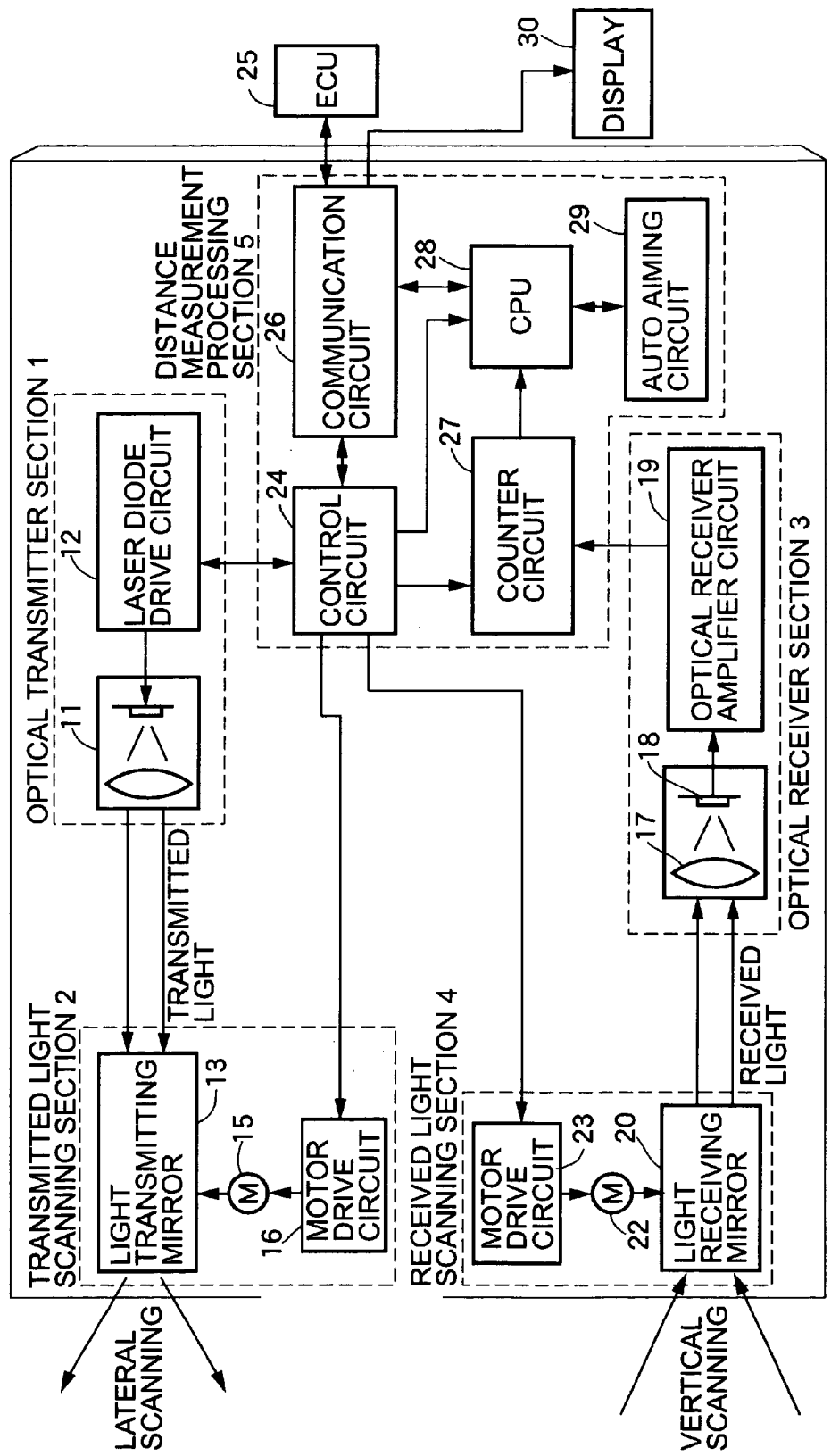
FIG. 1 is a schematic diagram of a radar system.
Figure 2:
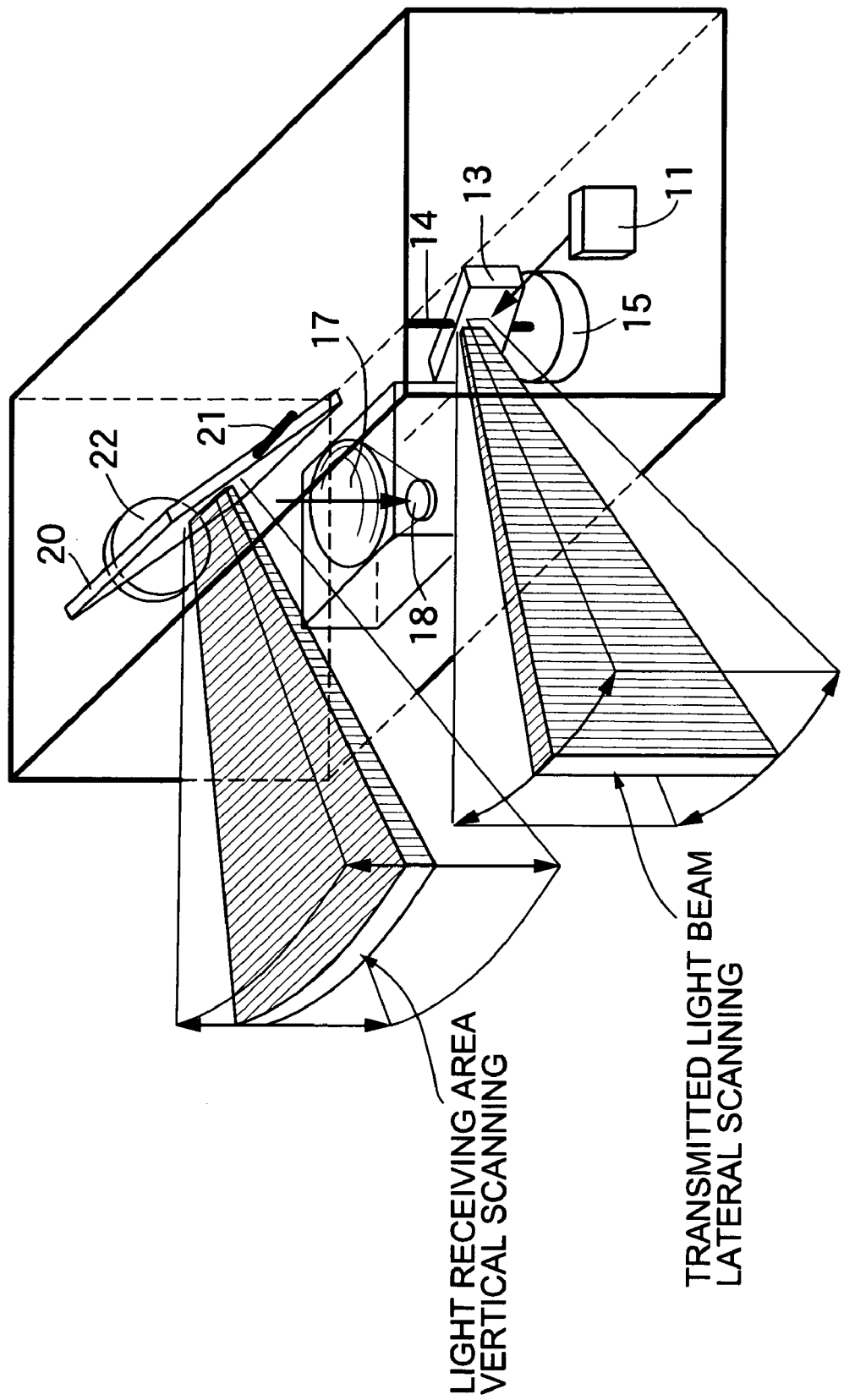
FIG. 2 is a perspective view of the radar system shown in FIG. 1.

As shown in FIGS. 1 and 2, a laser radar system Sr for detecting the distance and direction of an object in front of a subject vehicle includes an optical transmitter section 1, a transmitted light scanning section 2, an optical receiver section 3, a received light scanning section 4, and a distance measurement processing section 5. The optical transmitter section 1 includes a laser diode 11 having an integral light transmitting lens and a laser diode drive circuit 12 to drive the laser diode 11. The transmitted light scanning section 2 includes a light transmitting mirror 13 to reflect laser light output by the laser diode 11, a motor 15 to reciprocatingly pivot the light transmitting mirror 13 around a vertical shaft 14, and a motor drive circuit 16 to control the drive of the motor 15. The transmitted light beam output from the light transmitting mirror 13 has a vertical strip pattern with a width in the lateral, i.e., left and right direction restricted, and moves reciprocatingly in the lateral direction during a predetermined period to scan the object.

The optical receiver section 3 includes a light receiving lens 17, a photo diode 18 for receiving a reflected wave converged by the light receiving lens 17 and converting the reflected wave into an electrical signal, and an optical receiver amplifier circuit 19 for amplifying the signal output from the photo diode 18. The received light scanning section 4 includes a light receiving mirror 20 for reflecting a wave reflected from the object and guiding the reflected wave to the photo diode 18, a motor 22 for reciprocatingly pivoting the light receiving mirror 20 around a lateral shaft 21, and a motor drive circuit 23 for controlling the drive of the motor 22. A light receiving area, which has a lateral strip pattern with a restricted vertical width, is reciprocatingly moved in the vertical direction with a predetermined cycle by the light receiving mirror 20 to scan the object.

The distance measurement processing section 5 includes a control circuit 24 for controlling the laser diode drive circuit 12 and the motor drive circuits 16 and 23, a communication circuit 26 for carrying out communication between an electronic control unit 25 controlling, for example, the ACC system and a display 30 for displaying a result of auto aiming, a counter circuit 27 for counting the time from sending the laser light to receiving the laser light, a central processing unit 28 for calculating the distance to, and the direction of, the object, and an auto aiming circuit 29 for carrying out auto aiming.

A section in which the vertical strip of the transmitted light beam and the lateral strip of the light receiving area intersect each other is an instantaneous detection area. The instantaneous detection area moves in a zigzag manner over an entire detection area having a lateral width equal to the lateral scan width of the transmitted light beam and a vertical width equal to the vertical scan width of the light receiving area to scan the object. The distance to the object is detected based on the time elapsed from transmitting the light beam to receiving the reflected wave of the transmitted light beam reflected from the object. The direction of the object is detected based on the direction of the instantaneous detection area.

Figure 3:
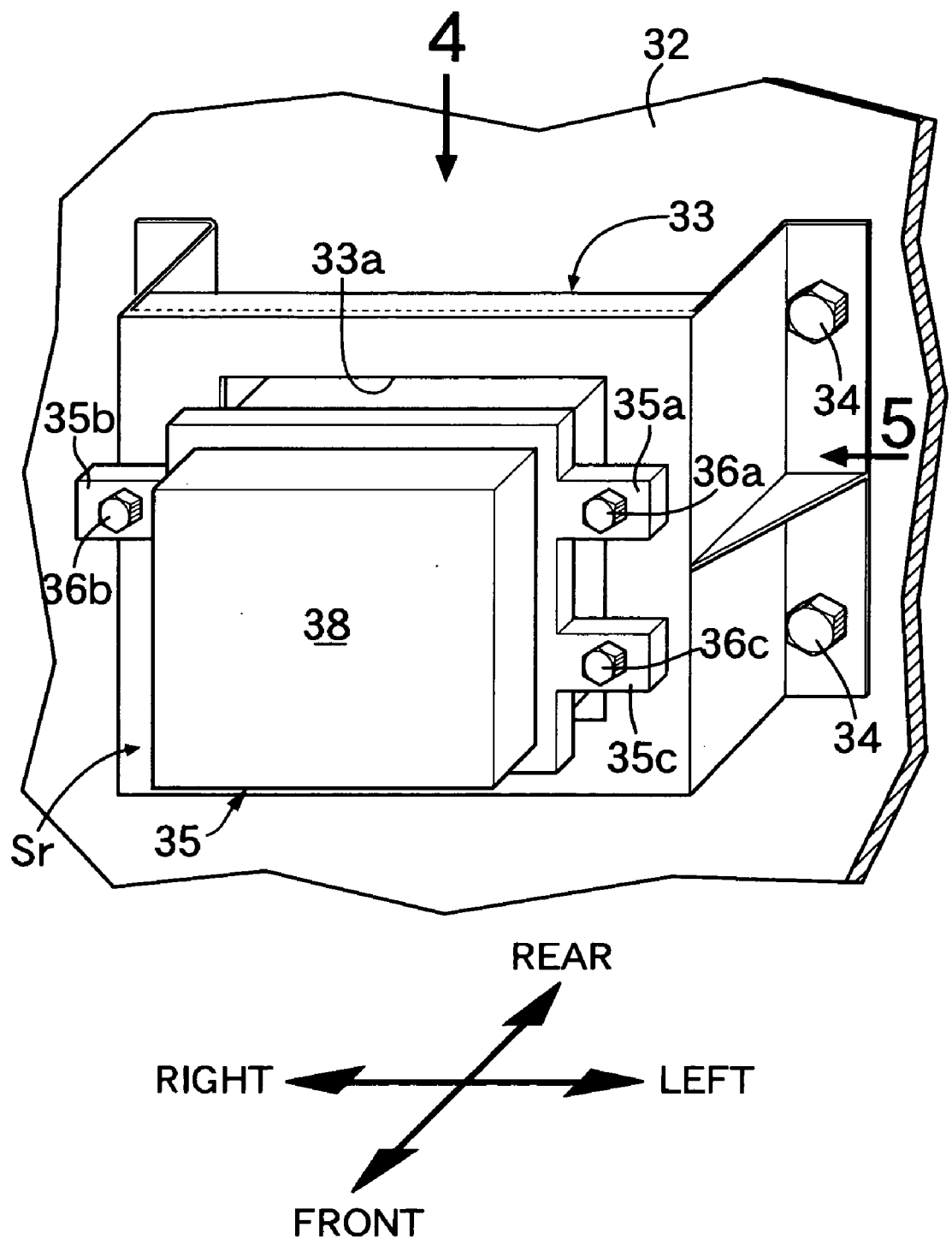
FIG. 3 is a perspective view of a radar system mounted on a vehicle body.

The mounting structure of the radar system Sr is now explained with reference to FIGS. 3–6. The terms front, rear, left, and right used herein are based on an occupant sitting in a seat of the subject vehicle, and are defined as shown in FIG. 3.

A bracket 33 is formed by bending a metal sheet to have an angular U-shaped cross section in plan view. Four corners of the bracket 33 are fixed to a vehicle body 32 via bolts 34. The radar system Sr has a rectangular parallelepiped-shaped casing 35 with stays 35a, 35b, and 35c integrally provided thereon and projecting from an outer periphery of the casing. The stays 35a, 35b, and 35c are each fixed to corresponding welded nuts 37a, 37b, and 37c of the bracket 33 via adjustment bolts 36a, 36b, and 36c. A rear portion of the casing 35 is fitted in an opening 33a formed in the front face of the bracket 33. The adjustment bolts 36a, 36b, and 36c are inserted from the front into bolt holes defined by the stays 35a, 35b, and 35c wherein each of the heads thereof is fitted in a corresponding bolt hole. The adjustment bolts 36a, 36b, and 36c are retained at the rear faces of the stays 35a, 35b, and 35c by push nuts 39 wherein they can rotate, but are prevented from falling out.

Among the adjustment bolts 36a, 36b, and 36c, adjustment bolts 36a and 36b are positioned in upper left and right parts on a front face 38 of the casing 35 of the radar system Sr. The remaining adjustment bolt 36c is disposed beneath the upper left adjustment bolt 36a, that is, in a lower left part on the front face 38 of the casing 35.

Figure 7:
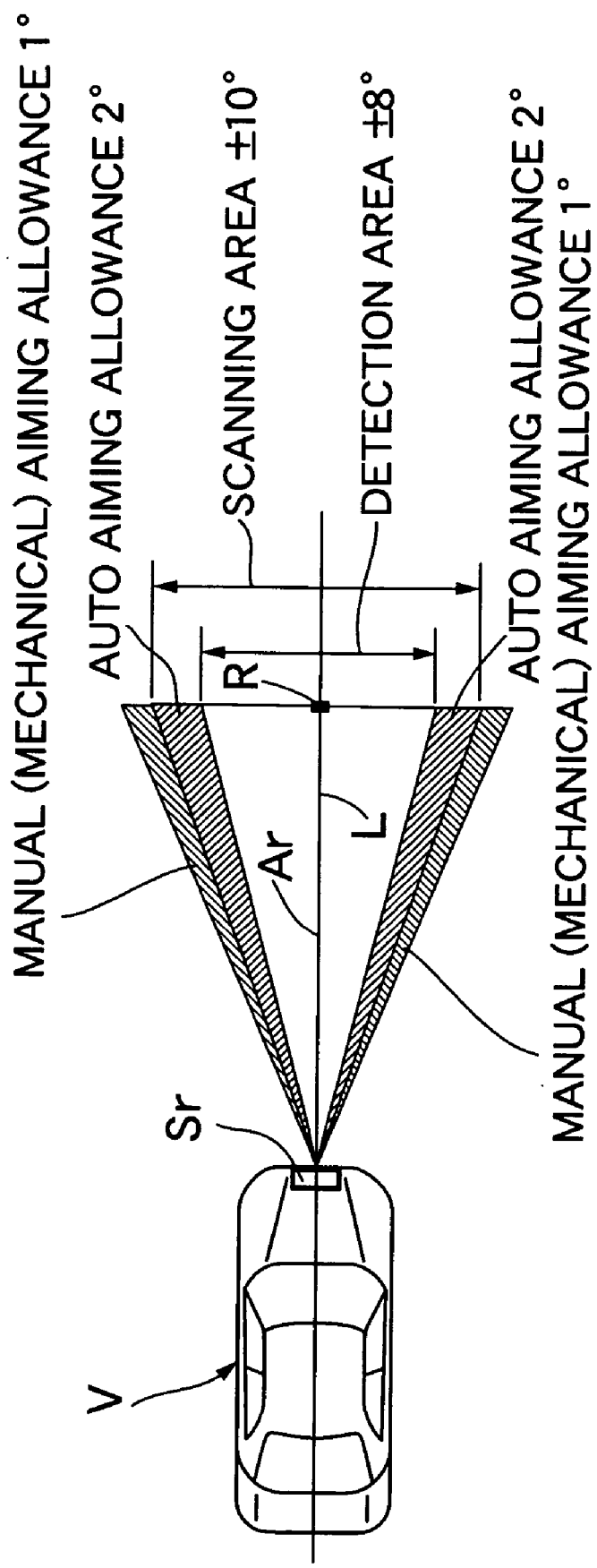
FIG. 7 is a diagram showing the positional relationship between a vehicle and a reference reflecting body.

As shown in FIG. 7, when adjusting the axis of the radar system Sr, a reference reflecting body R is positioned a predetermined distance, e.g., 5 m, from a front of a vehicle V on a vehicle body center line L. The reference reflecting body R is mounted on a post standing on a pedestal. The height of the reference reflecting body R from the floor surface is set to the same height of the radar system Sr.

In this state, the radar system Sr transmits a light beam and receives a reflected wave of the transmitted light beam reflected from the reference reflecting body R, and the position of the reference reflecting body R is detected. At this point, if the reference reflecting body R is detected to be in the center of a detection area spanning 8° in each of the left and right directions (a total of 16°) of the radar system Sr (that is, on the object detection axis Ar), the object detection axis Ar of the radar system Sr is correctly adjusted in the lateral direction, i.e., coincides with the vehicle body center line L. The scanning area over which the radar system Sr transmits the transmitted light beam is 10° in each of the left and right directions (a total of 20° ). The lateral angle of the 16° detection area inside the 20° scanning area is adjusted by auto aiming. That is, when the 16° detection area is set by auto aiming, there is a 2° allowance in each of the left and right directions for auto aiming. Furthermore, during manual aiming, where the angle at which the radar system Sr is mounted on the vehicle body 32 is mechanically adjusted, there is a 1° allowance in each of the left and right directions.

Adjustment of the object detection axis Ar in the vertical direction is carried out by placing a level on the upper face of the casing 35 and adjusting the object detection axis Ar to be horizontal. In this embodiment, the adjustment of the object detection axis Ar in the vertical direction is carried out by manual aiming where the angle at which the radar system Sr is mounted on the vehicle body 32 is mechanically adjusted.

Figure 12:
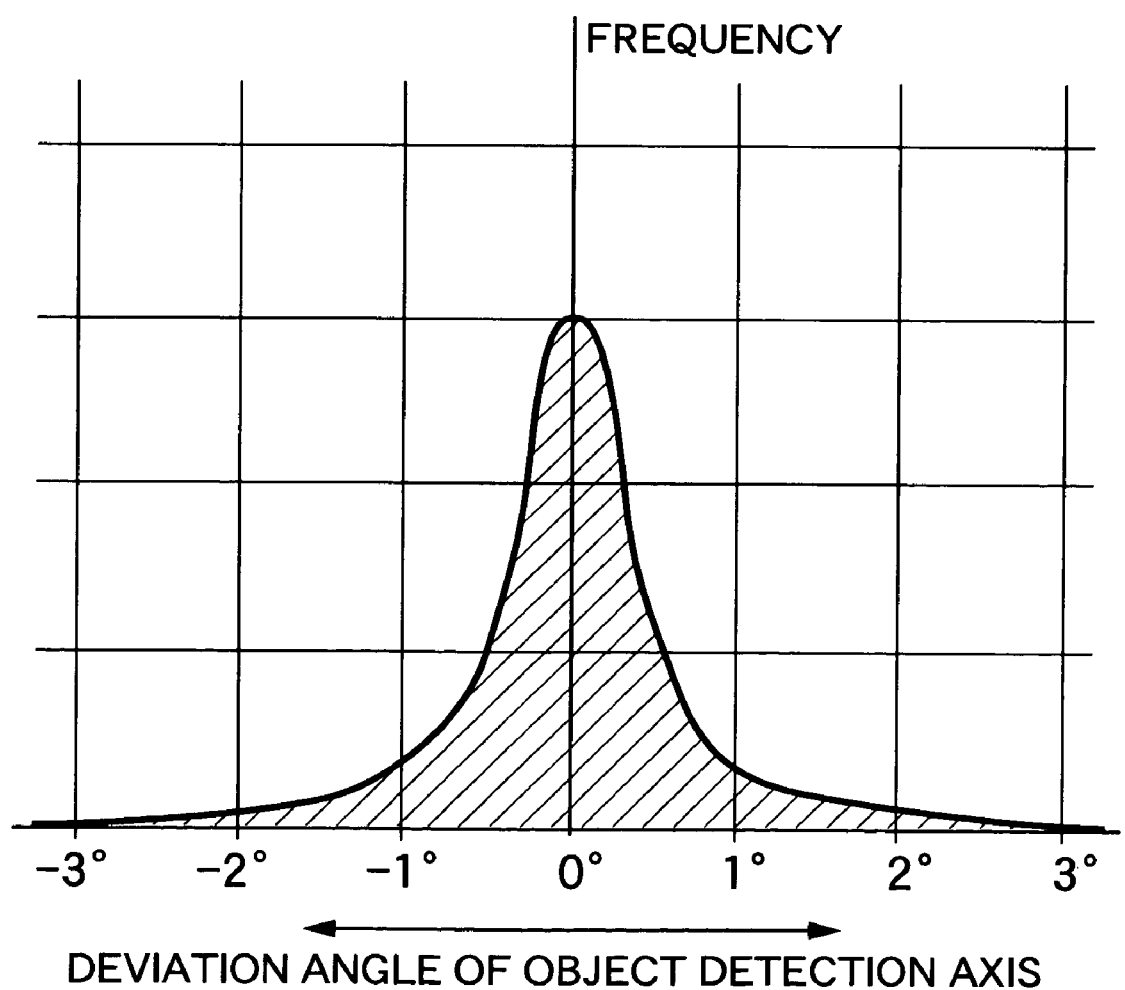
FIG. 12 is a graph showing the distribution of the deviation angle of an object detection axis relative to frequency of the deviation angle occurring.

FIG. 12 shows the frequency at which the deviation angle of the object detection axis Ar relative to the vehicle body center line L occurs when the radar system Sr is mounted on the vehicle body 32. The abscissa denotes the deviation angle of the object detection axis Ar, and the ordinate denotes the frequency at which the deviation angle occurs. As is clear from the graph, the distribution is a normal distribution as the deviation angle falls within ±2° for a majority of cases. There are very few cases in which the deviation angle is ±2° to ±3°, and there are almost no cases in which the deviation angle exceeds ±3°.

Therefore, if the detection angle for the reference reflecting body R, which corresponds to the deviation angle of the object detection axis Ar, is adjustable in the range of ±0° to ±2° by auto aiming, in most cases, adjustment of the axis is completed only by auto aiming. In rare cases, if the detection angle for the reference reflecting body R exceeds ±2°, adjustment of the axis is completed by using a combination of auto and manual aiming.

Figure 10A:
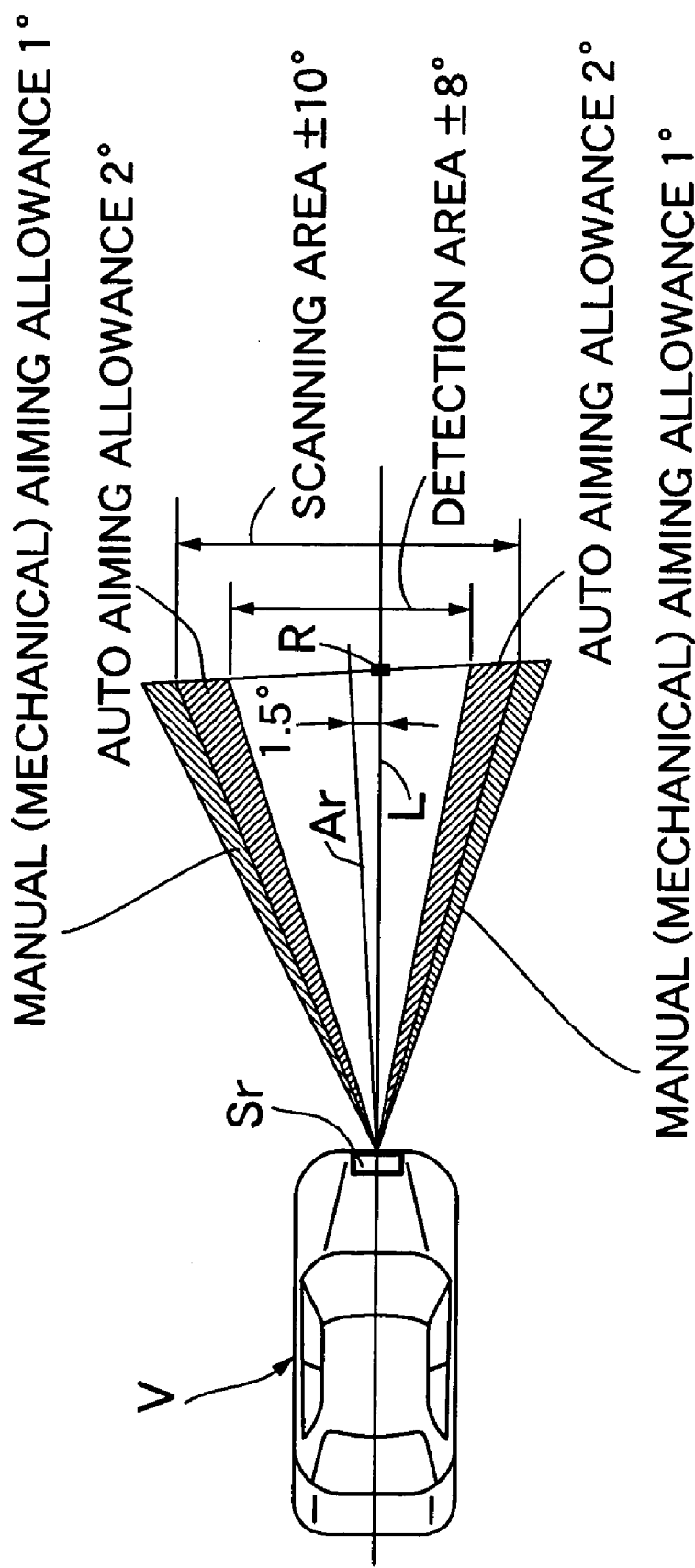
FIGS. 10A and B are diagrams showing the initial and completed operational states when axis adjustment is completed only by auto aiming.
Figure 10B:
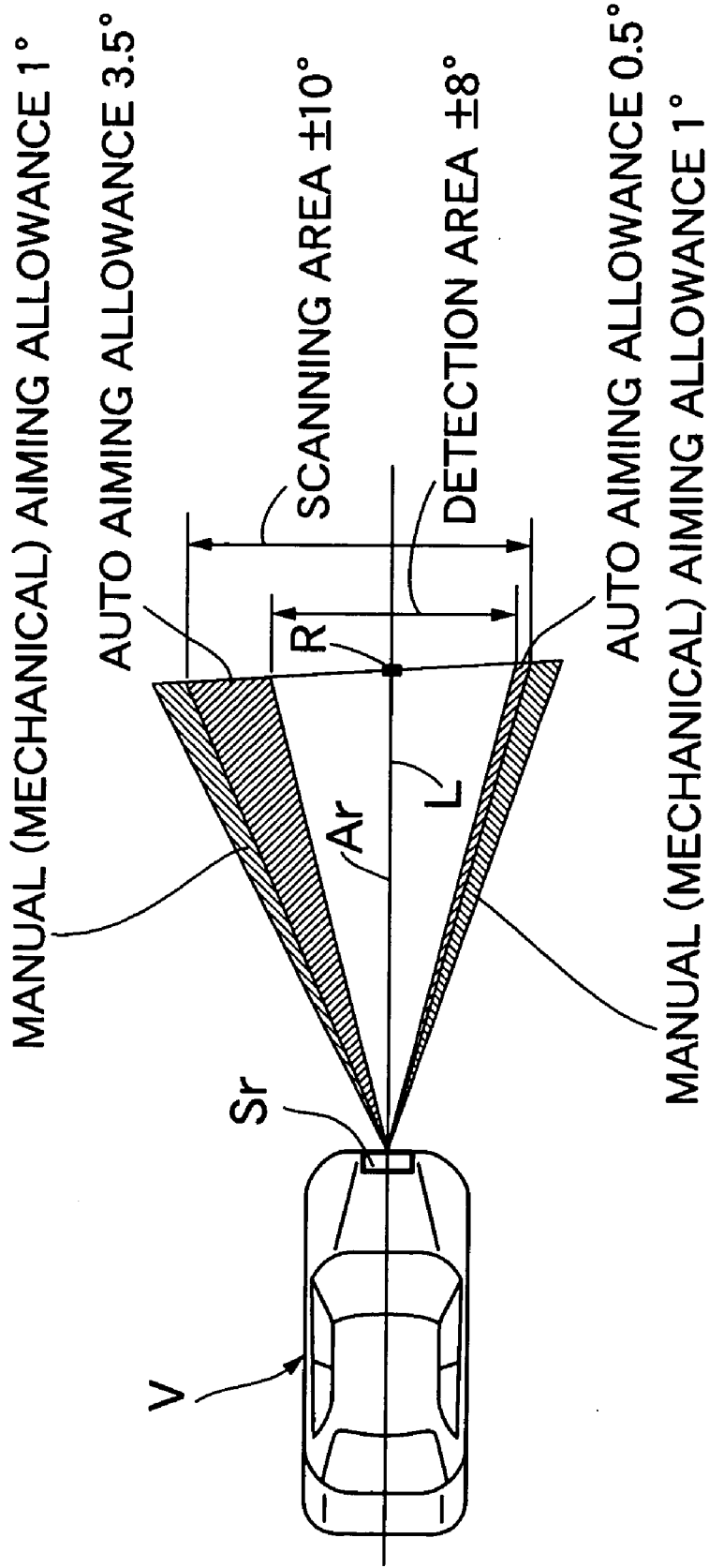

FIGS. 10A and B show the initial and completed operational states of adjustment of the axis where the object detection axis Ar of the radar system Sr deviates to the left by 1.5°. In the initial state shown in FIG. 10A, both the detection area and the scanning area deviate to the left 1.5° relative to the vehicle body center line L. In the state shown in FIG. 10B in which aiming is completed, the detection area is adjusted to the right by 1.5° by auto aiming so that the detected reference reflecting body R is in the center of the detection area. At this point, the detection area does not extend outside the scanning area, and a detection area of 16° in the lateral direction is maintained. In this way, when the deviation of the object detection axis Ar is ±2.0° or less, the object detection axis Ar is adjusted to coincide with the vehicle body center line L only by auto aiming. At this point, the display 30 displays 'LR 0.0', which indicates the deviation of the object detection axis Ar relative to the vehicle body center line L is ±0.0°.

Figure 11C:
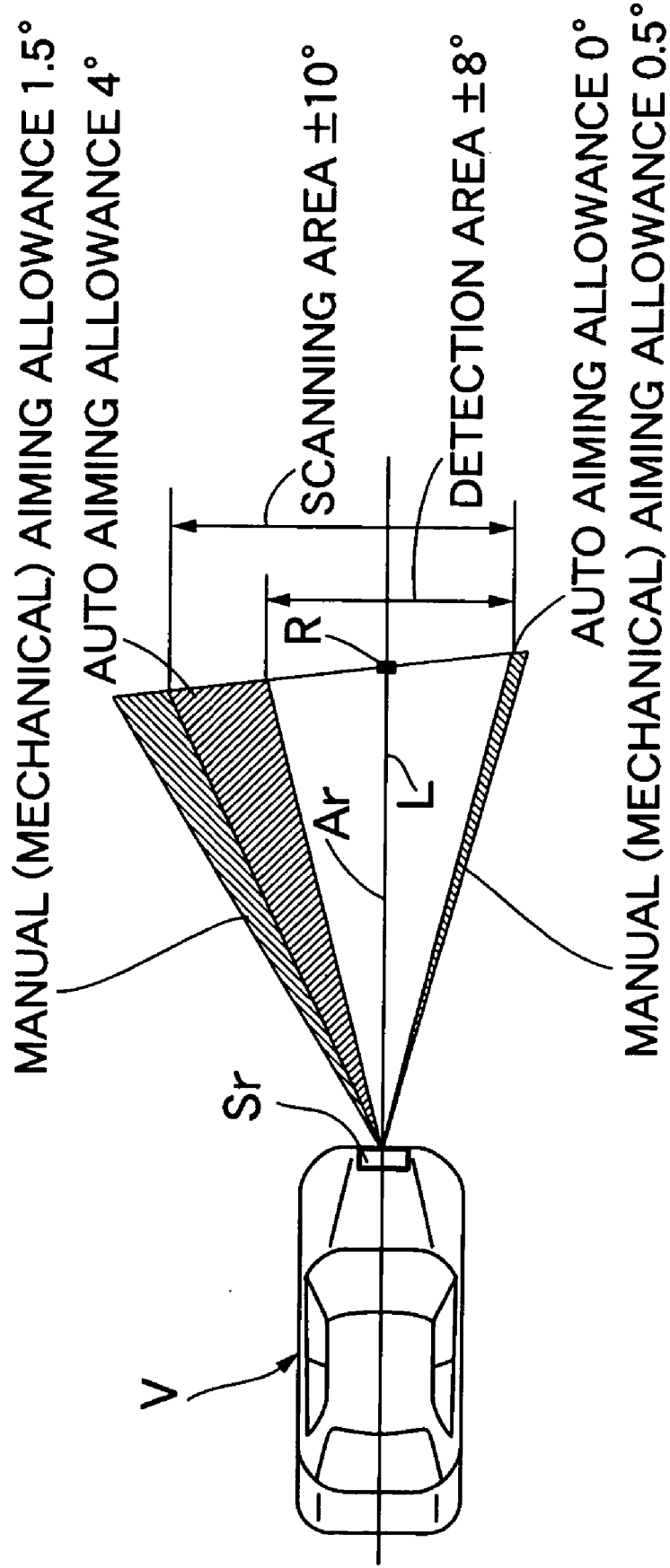

FIGS. 11A–C show the initial through completed operational states when the object detection axis Ar of the radar system Sr deviates to the left by 2.5°. In the initial state shown in FIG. 11A, both the detection area and the scanning area deviate from the vehicle body center line L by 2.5° to the left. In the state shown in FIG. 11B, wherein auto aiming is completed, the detection area is adjusted to the right by 2.0° so that the detected reference reflecting body R is as close to the center of the detection area as possible. As a result, the right hand end of the detection area overlaps the right hand end of the scanning area, and the right hand side allowance for auto aiming becomes 0.0°. Nevertheless, the object detection axis Ar still deviates from the vehicle body center line L by 0.5° to the left, and the display 30 displays 'L 0.5' to indicate such.

In this way, when the deviation of the object detection axis Ar is more than ±2.0° and the axis adjustment cannot be completed only by auto aiming, then, as shown in FIG. 11C, the axis adjustment is completed by manual aiming. That is, by tilting the angle at which the radar system Sr is mounted on the vehicle body 32 to the right by 0.5°, the object detection axis Ar coincides with the vehicle body center line L, thus completing adjustment of the axis. At this point, the display 30 displays 'LR 0.0', indicating the object detection axis Ar coincides with the vehicle body center line L.

A method for manual aiming will now be explained.

Figure 4:
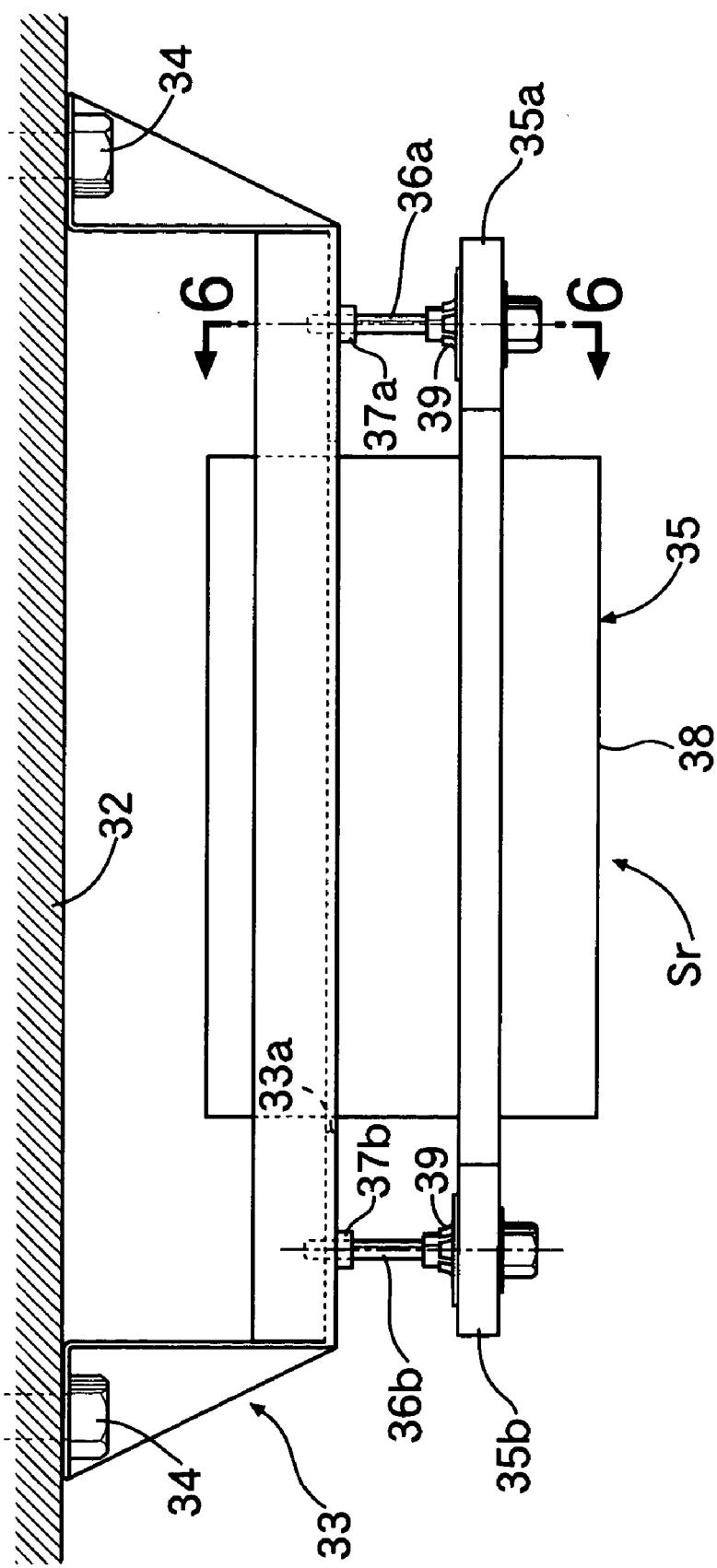
FIG. 4 is a top view of the radar system shown in FIG. 3.
Figure 5:
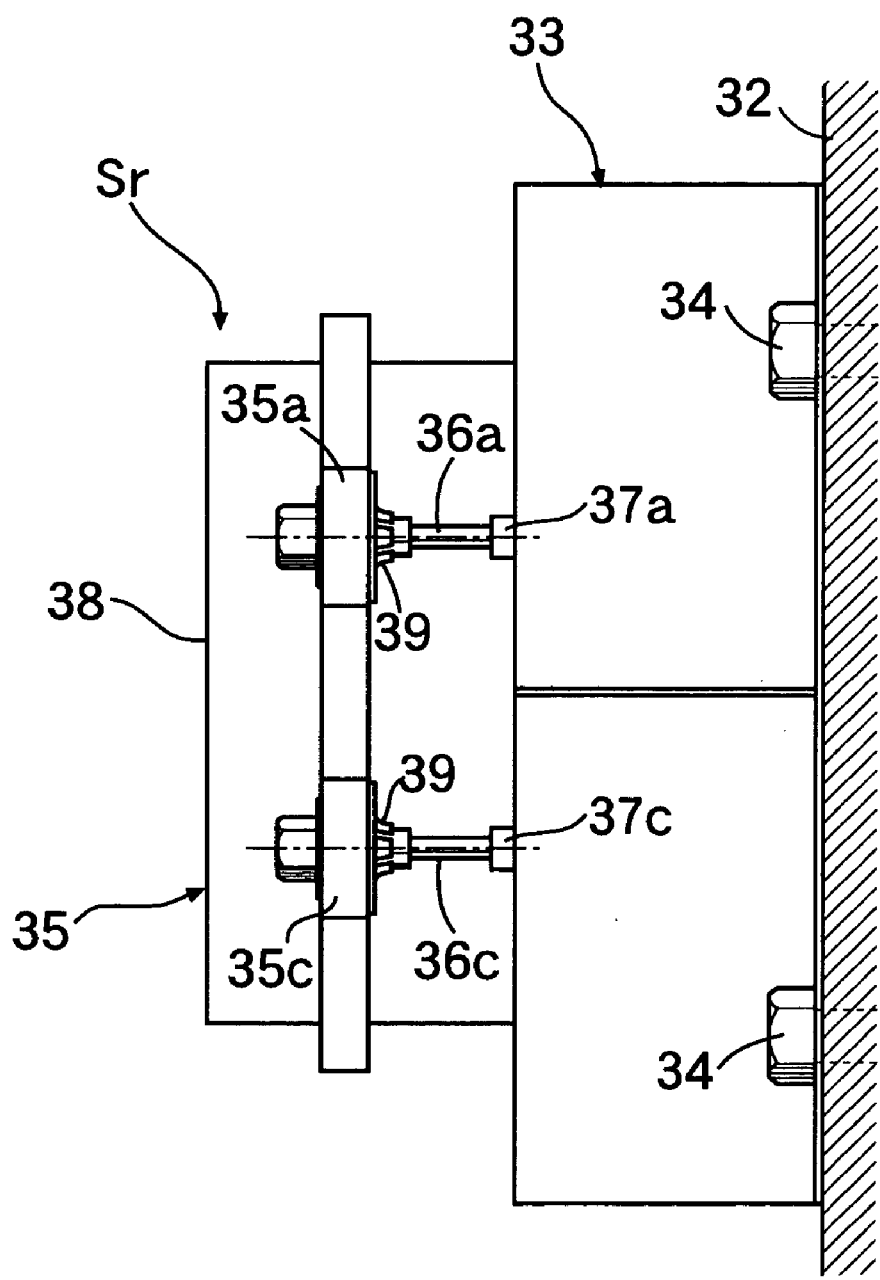
FIG. 5 is a side view of the radar system shown in FIG. 3.
Figure 6:
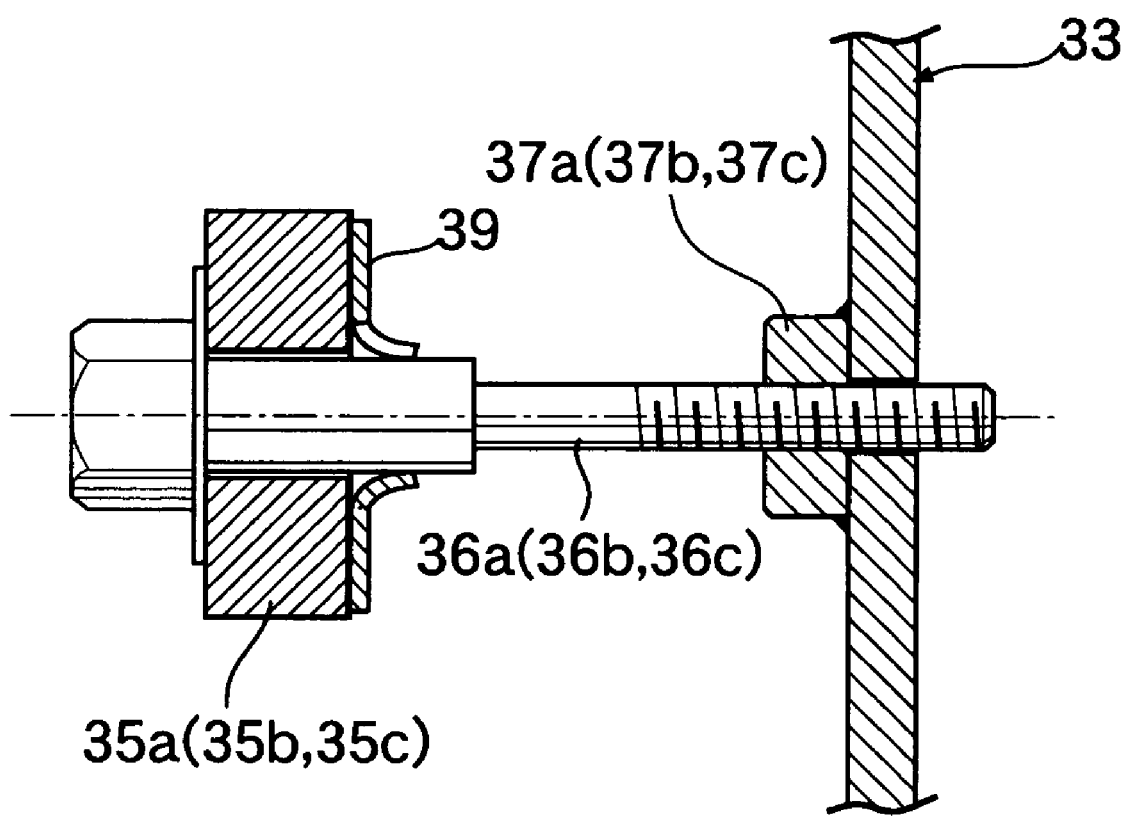
FIG. 6 is a cross-sectional view taken along line 6—6 in FIG. 4.

Referring to FIGS. 3 to 5, without operating the upper and lower left adjustment bolts 36a and 36c, respectively, screwing the upper right adjustment bolt 36b into the welded nut 37b moves the right side of the radar system Sr closer to the bracket 33, thereby adjusting the object detection axis Ar of the radar system Sr to the right. On the other hand, loosening the upper right adjustment bolt 36b relative to the welded nut 37b moves the right side of the radar system Sr in a direction away from the bracket 33, thereby adjusting the object detection axis Ar of the radar system Sr to the left.

A procedure for conducting the aiming operation will now be explained with reference to the flowcharts in FIGS. 8 and 9.

Figure 8:
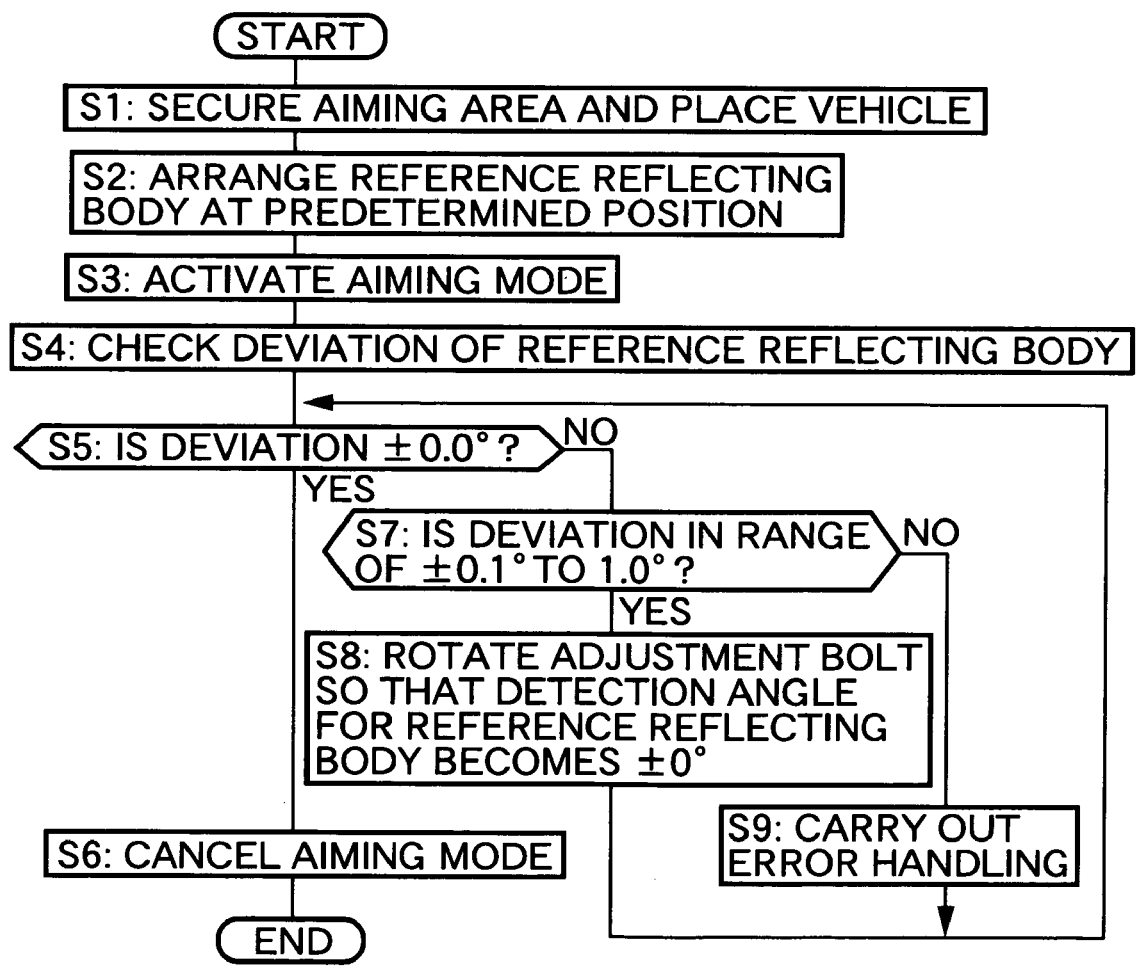
FIG. 8 is a flowchart of an aiming process.

In Step S1 of the flowchart in FIG. 8, the vehicle V is stopped while ensuring there is an aiming area in front of the vehicle V having a predetermined space. In Step S2, the reference reflecting body R is placed in front of the vehicle V a predetermined distance from the vehicle V on the vehicle body center line L. In subsequent Step S3, the reference reflecting body R is detected by activating the aiming mode. In Step S4, the deviation from the reference reflecting body R, that is, the angle between the object detection axis Ar and the reference reflecting body R after auto aiming, is checked on the display 30.

Figure 9:
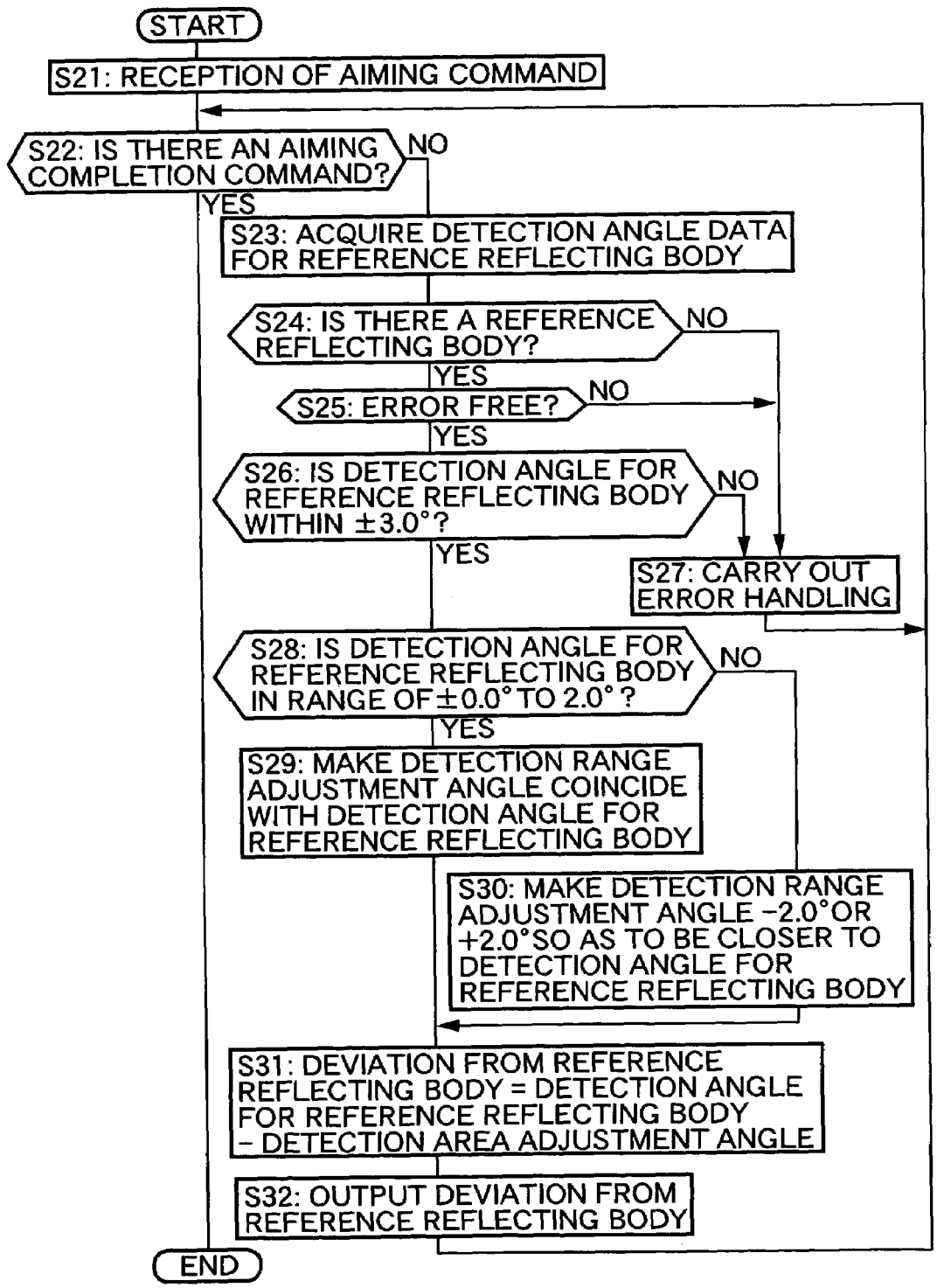
FIG. 9 is a flowchart of a subroutine of Step S4 of the flowchart in FIG. 8.

A subroutine of Step S4 is explained by referring to the flowchart in FIG. 9. If an aiming command is received in Step S21 and an aiming completion command is not received in Step S22, detection angle data for the reference reflecting body R is acquired in Step S23. As a result, if detection angle data is not obtained in Step S24, if an abnormality in the detection angle data is noted in Step S25, or if the detection angle for the reference reflecting body R exceeds ±3° in Step S26, then it is determined that an abnormality has occurred, and error handling is carried out in Step S27.

On the other hand, if the answer in each of Steps S24, S25, and S26 is YES and normal, and if the detection angle for the reference reflecting body R is in the range of ±0° to ±2° in Step S28, then in Step S29, the lateral angle of the detection area is adjusted only by the detection area adjustment angle using auto aiming, wherein the reference reflecting body R is detected in the center of a detection area of 16° in the lateral direction, that is, on the object detection axis Ar. At this point, since it is ensured the scanning area over which the transmitted light beam is transmitted is 20° in the lateral direction and there is a 20° auto aiming allowance in each of the left and right directions, the ends of the detection area will not extend outside the scanning area as a result of the auto aiming.

In Step S28, if the detection angle for the reference reflecting body R exceeds the range of ±0° to ±2°, in Step S30 the detection area is adjusted only by the detection area adjustment angle, i.e., 2° to the left or 2° to the right, by auto aiming, wherein the reference reflecting body R is as close as possible to the center of a detection area of 16° in the lateral direction, that is, on the object detection axis Ar. As a result, one of the left and right ends of the detection area overlaps the corresponding one of the left and right ends of the scanning area, and the reference reflecting body R still has a deviation from the center of the detection area.

In Step S31, the deviation from the reference reflecting body R, i.e., the angle formed between the object detection axis Ar and the reference reflecting body R after auto aiming, is calculated by subtracting the detection area adjustment angle, that is, the adjustment angle of the object detection axis Ar by auto aiming, from the detection angle for the reference reflecting body R. When Step S29 has been completed, since the detected angle of the reference reflecting body R equals the detection area adjustment angle, the deviation from the reference reflecting body R is always ±0.0°, and the axis adjustment is completed simply by auto aiming. On the other hand, when Step S30 has been completed, since the detection angle for the reference reflecting body R is greater than the detection area adjustment angle, a deviation from the reference reflecting body R still remains, and it is necessary to use manual aiming in combination with auto aiming. The deviation from the reference reflecting body R is then output in Step S32.

Returning to the flowchart in FIG. 8, if in Step S5 the deviation is ±0.0°, that is, if axis adjustment has been completed, then the aiming mode is canceled in Step S6. That is, when the deviation is ±0.0° in Step S32 of the flowchart in FIG. 9, that is, when the adjustment has been completed only by auto aiming, the procedure moves from Step S5 directly to Step S6.

On the other hand, if in Step S5 the deviation is not ±0.0°, and if in Step S7 the deviation is in the range of ±0.1° to ±1.0°, then in Step S8 manual aiming is carried out using the adjustment bolts 36a to 36c so that the detection angle for the reference reflecting body R is ±0.0°. If in Step S7 the deviation exceeds ±1.0°, since adjustment cannot be completed even with manual aiming, an error handling is carried out in Step S9.

As described above, when the object detection axis Ar is adjusted in the lateral direction, since a frequent deviation of ±2.0° or less is adjusted by auto aiming, and a less frequent deviation exceeding ±2.0° is adjusted by using manual aiming in combination with auto aiming, a scanning area of 22°, which is required when adjustment is carried out only by auto aiming, can be reduced to 20°, and the auto aiming allowance, which is not directly used for detection of the object, can be reduced from 6° to 4°.

Vertical adjustment of the object detection axis Ar is carried out by manual aiming. That is, a level is placed on the upper face of the casing 35 of the radar system Sr, and the vertical angle at which the casing 35 is mounted on the vehicle body 32 is adjusted so the level indicates the upper face is horizontal.

More specifically, without operating either the upper left adjustment bolt 36a or the upper right adjustment bolt 36b, screwing the lower left adjustment bolt 36c into the welded nut 37c moves the lower side of the radar system Sr closer to the bracket 33, thereby adjusting the object detection axis Ar of the radar system Sr downward. In contrast, loosening the lower left right adjustment bolt 36c relative to the welded nut 37c moves the lower side of the radar system Sr in a direction away from the bracket 33, thereby adjusting the object detection axis Ar of the radar system Sr upward.

A second embodiment of the present invention is explained below with reference to FIGS. 13 and 14.

In the above-described first embodiment, when the detection angle for the reference reflecting body R exceeds the range of ±0° to ±2°, the detection area is adjusted 2° to the left or right simply by auto aiming, and the shortfall in the angle that cannot be adjusted simply by auto aiming is adjusted by manual aiming. However, in the second embodiment, even when the detection angle for the reference reflecting body R exceeds the range of ±0° to ±2°, the adjustment is basically carried out by auto aiming. As a result, a portion of the detection area extends outside the scanning area, and adjustment of the detection angle is carried out by manual aiming so the portion of the detection area extending outside falls within the scanning area. This feature is further explained with reference to the flowchart in FIG. 13.

Figure 13:
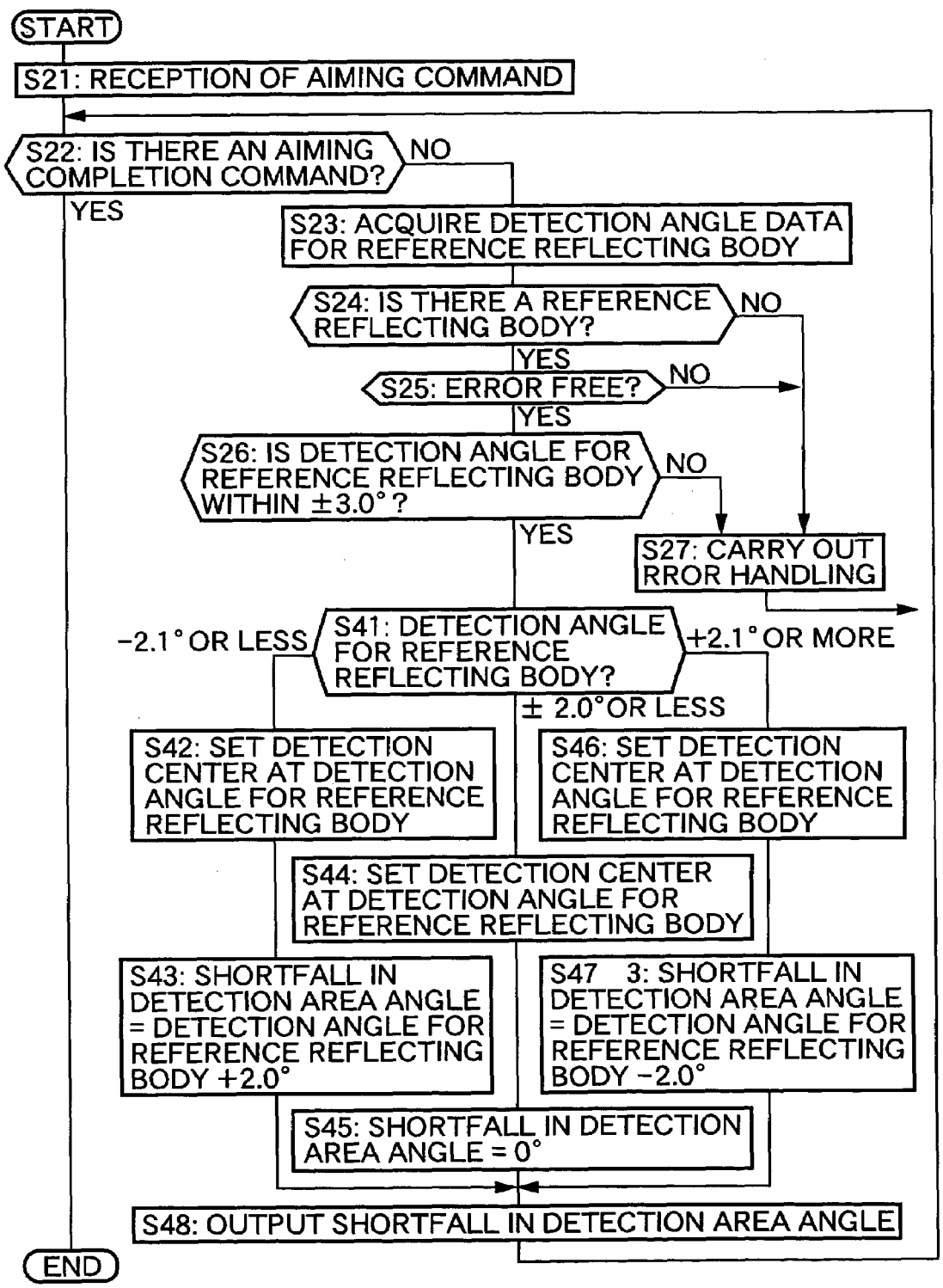
FIG. 13 is a flowchart, corresponding to FIG. 9, of a second embodiment of the present invention.

Steps S21 to S27 of the flowchart in FIG. 13 of the second embodiment are identical to Steps S21 to S27 of the flowchart in FIG. 9 of the first embodiment. If in Step S26 the detection angle for the reference reflecting body R is within ±3°, and if in Step S41 the detection angle for the reference reflecting body R is −2.1° or less, that is, if the detection angle for the reference reflecting body R is in the range of −2.1° to −3.0°, then in Step S42 the center of detection is set at the detection angle for the reference reflecting body R, thereby making the object detection axis Ar coincide with the vehicle body center line L of the vehicle V. As a result, a portion of the detection area extends outside the scanning area, and in Step S43 the amount that extends outside the scanning area, i.e., a shortfall in the detection area angle, is calculated from the detection angle for the reference reflecting body R+2.0°.

Furthermore, in Step S41, if the detection angle for the reference reflecting body R is ±2.0° or less, that is, if the detection angle for the reference reflecting body R is in the range of −2.0° to 2.0°, in Step S44 the center of detection is set at the detection angle for the reference reflecting body R, thereby making the object detection axis Ar coincide with the vehicle body center line L of the vehicle V. In this case, since no portion of the detection area extends outside the scanning area, in Step S45 the shortfall in the detection area angle is 0°.

Moreover, in Step S41, if the detection angle for the reference reflecting body R is +2.1° or more, that is, if the detection angle for the reference reflecting body R is in the range of +2.1° to +3.0°, in Step S46 the center of detection is set at the detection angle for the reference reflecting body R, thereby making the object detection axis Ar coincide with the vehicle body center line L of the vehicle V. As a result, a portion of the detection area extends outside the scanning area, and in Step S47 the amount extending outside the scanning area, i.e., the shortfall in the detection area angle, is calculated from the detection angle for the reference reflecting body R−2.0°. In Step S48, the shortfall in the detection area angle calculated in Steps S43, S45, or S47 is displayed on the display 30.

Figure 14A:
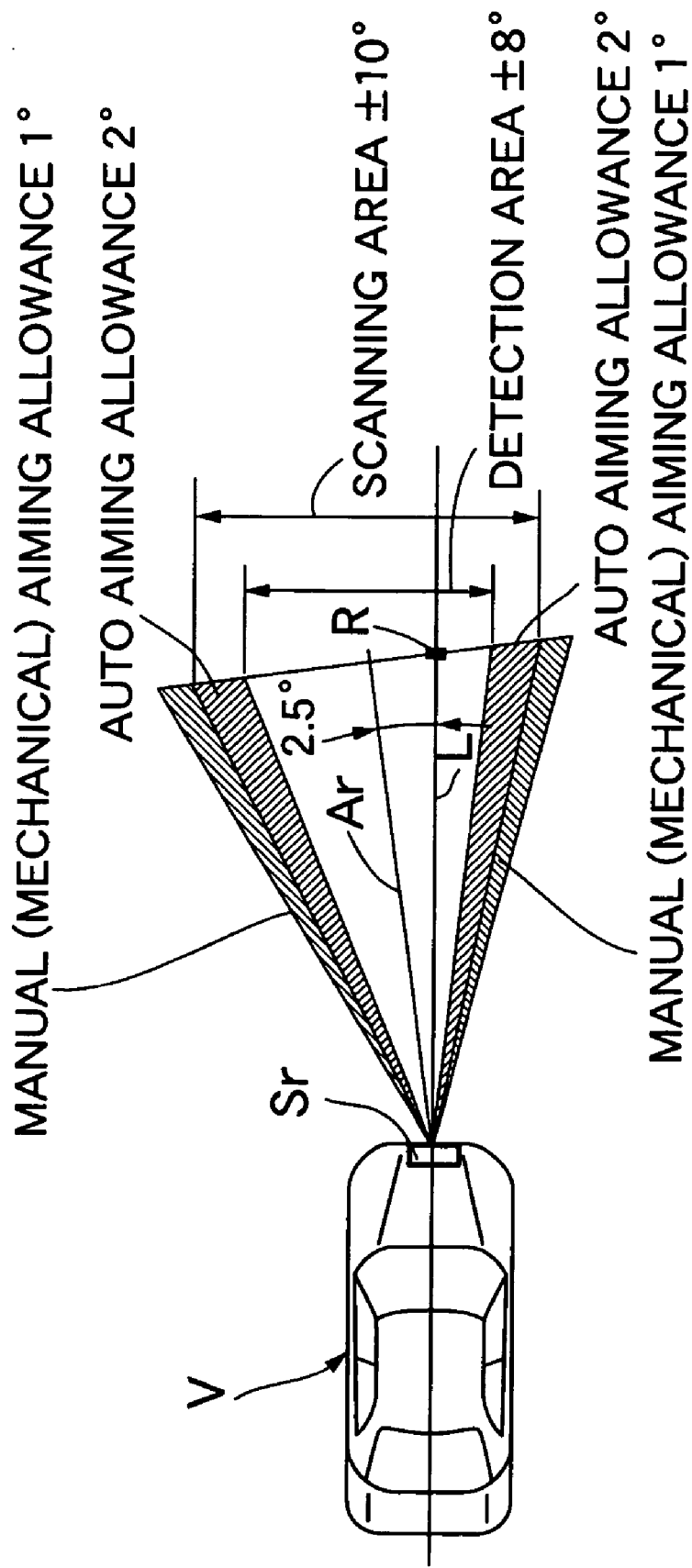
Figure 14B:
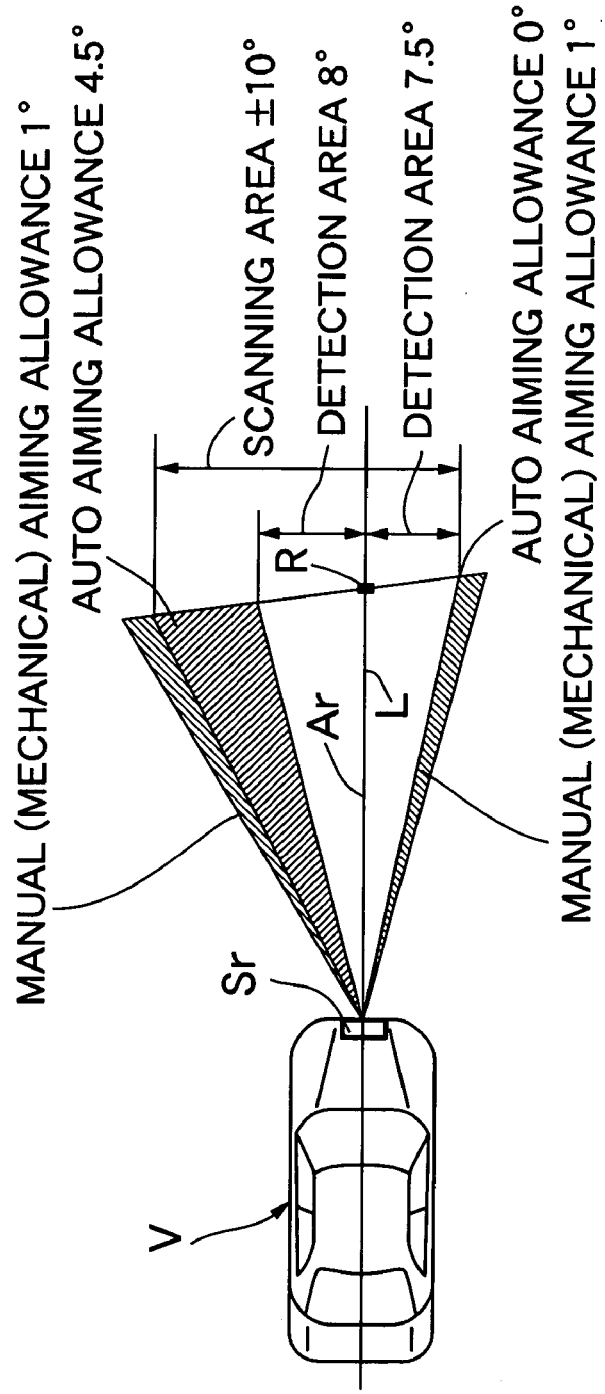

FIGS. 14A–C show the initial through completed operational states when the object detection axis Ar of the radar system Sr deviates to the left by 2.5°. In the initial state shown in FIG. 14A, both the detection area and the scanning area deviate from the vehicle body center line L by 2.5° to the left. In the auto aiming completion state shown in FIG. 14B, the detection area is adjusted to the right by 2.5° so the detected reference reflecting body R coincides with the center of the detection area, i.e., the object detection axis Ar. As a result, the right hand end of the detection area extends outside the right hand end of the scanning area by 0.5°, and the detection area on the right hand side of the object detection axis Ar is 7.5°, which is narrower than the original 8°. The display 30 displays 'L 0.5' to indicate such.

In this way, when the deviation of the object detection axis Ar exceeds ±2.0° and the axis adjustment cannot be completed simply by auto aiming, as shown in FIG. 14C, the axis adjustment is completed by manual aiming. That is, the scanning area is tilted to the right by 0.5° by tilting the angle at which the radar system Sr is mounted on the vehicle body 32 by 0.5° to the right so the entire detection area falls within the scanning area, thus completing adjustment of the axis. At this point, the display 30 displays 'LR 0.0', which indicates the adjustment of the axis has been completed.

The second embodiment provides the following effects in addition to the effects provided by the first embodiment. That is, in the second embodiment, when both auto aiming and manual aiming are required due to a large deviation of the object detection axis Ar, even if manual aiming is not carried out, it is guaranteed the object detection axis Ar of the radar system Sr will coincide with the vehicle body center line L. In this case, although a left half or a right half of the detection area is narrower than the original 8°, erroneous detection of a vehicle on an adjacent lane due to the object detection axis Ar deviating from the vehicle body center line L is avoided.

Although preferred embodiments of the present invention are explained in detail above, the present invention can be modified in a variety of ways without departing from the subject matter of the present invention. For example, the transmitter and receiver of the present invention is not limited to the laser radar system Sr, and may be a milli-wave radar. Furthermore, in the embodiments, lateral axis adjustment of the object detection axis Ar is carried out by auto aiming, but vertical adjustment of the axis can also be carried out by auto aiming.

What is claimed is:

1. A moving body transmitter and receiver axis adjusting system, comprising:

a transmitter and receiver mounted on a moving body, the transmitter and receiver transmitting a detection signal in a predetermined scanning area and receiving, as a reflected signal, the detection signal reflected from an object;

a reference reflecting body placed in a predetermined position relative to the moving body, the reference reflecting body reflecting the detection signal;

automatic adjusting means for setting a detection area included in the scanning area and narrower than the scanning area, the automatic adjusting means capable of adjusting the detection area within the scanning area, wherein the reference reflecting body is positioned on an object detection axis of the detection area; and informing means for informing of an amount of a deviation between the object detection axis and the reference reflecting body that exceeds an area adjustable by the automatic adjusting means.

2. The axis adjusting system according to claim 1, wherein the transmitter and receiver is mounted on the moving body via manual adjusting means to adjust a deviation between the reference reflecting body and the object detection axis that exceeds the area adjustable by the automatic adjusting means.

3. A moving body transmitter and receiver axis adjusting system, comprising:

a transmitter and receiver mounted on a moving body, the transmitter and receiver transmitting a detection signal in a predetermined scanning area and receiving, as a reflected signal, the detection signal reflected from an object;

a reference reflecting body placed in a predetermined position relative to the moving body, the reference reflecting body reflecting the detection signal;

automatic adjusting means for setting a detection area narrower than the scanning area, the automatic adjusting means capable of adjusting the detection area, wherein the reference reflecting body is positioned on an object detection axis of the detection area; and informing means for informing of an amount of the extent to which the detection area is outside the scanning area as a result of the adjustment by the automatic adjusting means.

4. The axis adjusting system according to claim 3, wherein the transmitter and receiver is mounted on the moving body via manually adjustable manual adjusting means, wherein the extent the detection area is outside the scanning area is adjusted using the automatic adjusting means and reduced to zero, and the detection area falls within the scanning area.

* * * * *